(12) United States Patent
Pantazi et al.

(10) Patent No.: US 8,401,676 B2
(45) Date of Patent: Mar. 19, 2013

(54) PERFORMANCE IMPROVEMENT OF SIGNAL TRANSFORMATION SCHEMES FOR ULTRA-FAST SCANNING

(75) Inventors: Angeliki Pantazi, Rueschlikon (CH); Abu Sebastian, Rueschlikon (CH); Tomas Tuma, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/858,765

(22) Filed: Aug. 18, 2010

(65) Prior Publication Data

US 2012/0046762 A1    Feb. 23, 2012

(51) Int. Cl.
*G05B 13/02* (2006.01)

(52) U.S. Cl. ............. 700/45; 700/44; 700/28; 706/13; 706/45

(58) Field of Classification Search ............. 700/45, 700/44, 28; 706/13, 45
See application file for complete search history.

(56) References Cited

U.S. PATENT DOCUMENTS

| | | | | |
|---|---|---|---|---|
| 3,925,645 A * | 12/1975 | Stern | | 700/45 |
| 3,958,109 A * | 5/1976 | Doherty et al. | | 700/44 |
| 3,965,674 A * | 6/1976 | Hobbs et al. | | 60/39.182 |
| 4,006,346 A * | 2/1977 | Pemberton | | 700/45 |
| 4,038,531 A * | 7/1977 | Loe, Jr. | | 700/45 |
| 4,184,324 A * | 1/1980 | Kiscaden et al. | | 700/288 |
| 4,222,229 A * | 9/1980 | Uram | | 60/39.182 |
| 4,308,463 A * | 12/1981 | Giras et al. | | 700/287 |
| 4,327,294 A * | 4/1982 | Smith et al. | | 290/40 C |
| 4,333,310 A * | 6/1982 | Uram | | 60/39.182 |
| 4,745,497 A | 5/1988 | Ozawa | | |
| 4,998,051 A * | 3/1991 | Ito | | 700/45 |
| 5,043,863 A * | 8/1991 | Bristol et al. | | 700/45 |
| 5,223,778 A * | 6/1993 | Svarovsky et al. | | 700/45 |
| 5,442,544 A * | 8/1995 | Jelinek | | 700/45 |
| 5,483,439 A * | 1/1996 | Ono et al. | | 700/45 |
| 5,488,561 A * | 1/1996 | Berkowitz et al. | | 700/45 |
| 5,548,192 A * | 8/1996 | Hanks | | 700/45 |
| 5,584,172 A * | 12/1996 | Oguchi et al. | | 60/39.5 |
| 5,813,212 A * | 9/1998 | Oguchi et al. | | 60/39.5 |
| 5,855,111 A * | 1/1999 | Oguchi et al. | | 60/39.5 |
| 5,949,677 A * | 9/1999 | Ho | | 700/28 |
| 5,992,383 A * | 11/1999 | Scholten et al. | | 700/45 |
| 6,013,995 A * | 1/2000 | Kim | | 700/45 |
| 6,079,205 A * | 6/2000 | Yasui et al. | | 700/28 |
| 6,082,099 A * | 7/2000 | Yasui et al. | | 700/28 |

(Continued)

OTHER PUBLICATIONS

Sebastian, et al., "Design Methodologies for Robust Nano-Positioning", IEEE Transactions on control system technology, Nov. 2005, pp. 868-876, vol. 13(6).

(Continued)

*Primary Examiner* — Mohammad Ali
*Assistant Examiner* — Kelvin Booker
(74) *Attorney, Agent, or Firm* — Cantor Colburn LLP; Daniel Morris (57) ABSTRACT

A mechanism for controlling a plant is provided. A reference signal is received at a signal transformation loop of a feedback controller. The signal transformation loop causes the reference signal to include a disturbance signal and a nominal signal. Also, the reference signal is received at a feed-forward controller, and the feed-forward controller recreates the disturbance signal that was caused by the signal transformation loop. The output of the feedback controller is input into a plant. The output of the feed-forward controller is input into the plant such that the disturbance signal is removed from the output of the feedback controller.

20 Claims, 7 Drawing Sheets

U.S. PATENT DOCUMENTS

| | | | |
|---|---|---|---|
| 6,094,601 A * | 7/2000 | Popovich | 700/28 |
| 6,102,958 A * | 8/2000 | Meystel et al. | 700/286 |
| 6,195,596 B1 * | 2/2001 | Kim | 700/245 |
| RE37,560 E | 2/2002 | Elings | |
| 6,564,194 B1 * | 5/2003 | Koza et al. | 706/52 |
| 6,567,711 B1 * | 5/2003 | Hosek et al. | 700/30 |
| 6,577,908 B1 * | 6/2003 | Wojsznis et al. | 700/28 |
| 6,614,615 B1 * | 9/2003 | Ju et al. | 360/78.04 |
| 6,680,607 B2 * | 1/2004 | Smith | 700/45 |
| 6,684,114 B1 * | 1/2004 | Erickson et al. | 700/45 |
| 6,839,598 B2 * | 1/2005 | Yasui et al. | 700/28 |
| 6,853,158 B2 * | 2/2005 | Tan et al. | 318/135 |
| 6,859,341 B2 * | 2/2005 | Min et al. | 360/77.04 |
| 6,859,717 B2 * | 2/2005 | Yasui et al. | 700/28 |
| 6,904,422 B2 * | 6/2005 | Calise et al. | 706/23 |
| 6,920,362 B2 * | 7/2005 | Matsumoto | 700/45 |
| 6,922,596 B2 * | 7/2005 | Erickson et al. | 700/28 |
| 7,035,695 B2 * | 4/2006 | Boiko | 700/28 |
| 7,050,865 B2 * | 5/2006 | Yasui et al. | 700/28 |
| 7,113,834 B2 * | 9/2006 | Wojsznis et al. | 700/45 |
| 7,117,186 B2 * | 10/2006 | Koza et al. | 706/13 |
| 7,123,973 B2 * | 10/2006 | Rutherford | 700/28 |
| 7,207,119 B1 * | 4/2007 | Eleftheriou et al. | 33/551 |
| 7,251,536 B2 * | 7/2007 | Hashimoto et al. | 700/28 |
| 7,266,425 B2 | 9/2007 | Bhatt et al. | |
| 7,684,879 B2 * | 3/2010 | Yutkowitz | 700/29 |
| 7,756,592 B2 * | 7/2010 | Craven | 700/44 |
| 7,835,937 B1 * | 11/2010 | Karlsson et al. | 705/7.31 |
| 7,835,938 B1 * | 11/2010 | Karlsson | 705/7.31 |
| 7,930,045 B2 * | 4/2011 | Cheng | 700/45 |
| 7,991,486 B2 * | 8/2011 | Miyamoto et al. | 700/28 |
| 8,000,817 B2 * | 8/2011 | Spindler et al. | 700/45 |
| 8,145,329 B2 * | 3/2012 | Pekar et al. | 700/45 |
| 8,180,464 B2 * | 5/2012 | Gao et al. | 700/44 |
| 8,214,063 B2 * | 7/2012 | Ellis et al. | 700/45 |
| 8,244,384 B2 * | 8/2012 | Pachner et al. | 700/28 |
| 2001/0053941 A1 * | 12/2001 | Matsumoto | 700/45 |
| 2002/0063539 A1 * | 5/2002 | Tan et al. | 318/135 |
| 2003/0060902 A1 * | 3/2003 | Miller | 700/28 |
| 2003/0139826 A1 * | 7/2003 | Yasui et al. | 700/28 |
| 2003/0153990 A1 * | 8/2003 | Boiko | 700/45 |
| 2003/0187522 A1 * | 10/2003 | Yasui et al. | 700/28 |
| 2003/0214281 A1 * | 11/2003 | Smith | 324/76.79 |
| 2003/0229408 A1 * | 12/2003 | Yasui et al. | 700/28 |
| 2004/0013420 A1 | 1/2004 | Hara | |
| 2004/0030414 A1 * | 2/2004 | Koza et al. | 706/13 |
| 2004/0030416 A1 * | 2/2004 | Erickson et al. | 700/28 |
| 2005/0107895 A1 * | 5/2005 | Pistikopoulos et al. | 700/28 |
| 2005/0203642 A1 * | 9/2005 | Yasui | 700/28 |
| 2006/0020352 A1 * | 1/2006 | Martin et al. | 700/29 |
| 2006/0036336 A1 * | 2/2006 | Chandhoke | 700/28 |
| 2006/0089731 A1 * | 4/2006 | Kawakatsu et al. | 700/28 |
| 2006/0100720 A1 * | 5/2006 | Martin et al. | 700/44 |
| 2006/0241786 A1 * | 10/2006 | Boe et al. | 700/28 |
| 2007/0021850 A1 * | 1/2007 | Wojsznis et al. | 700/42 |
| 2007/0132423 A1 | 6/2007 | Ajima et al. | |
| 2008/0221710 A1 * | 9/2008 | Brunell | 700/45 |
| 2009/0005886 A1 * | 1/2009 | Gao et al. | 700/29 |
| 2009/0248773 A1 | 10/2009 | Sebastian et al. | |
| 2010/0087933 A1 * | 4/2010 | Cheng | 700/30 |
| 2010/0198371 A1 * | 8/2010 | Takagi | 700/44 |
| 2010/0305719 A1 * | 12/2010 | Pekar et al. | 700/44 |
| 2011/0144813 A1 * | 6/2011 | Agahi | 700/44 |
| 2011/0257768 A1 * | 10/2011 | Pantazi et al. | 700/33 |

OTHER PUBLICATIONS

Jin-Hua She, et al., "High-Precision Positioning Control by Position-Dependent Repetitive Control Method", Feb. 1995, pp. 374-379, 1st World Congress Intelligent Manufacturing Processes & Systems, vol. 1, Mayaguez/San Juan, Puerto Rico.

S. Devasia, et al., "A Survey of Control Issues in Nanopositioning", IEEE Transaction on control system technology, Sep. 2007, pp. 802-823, vol. 15(5).

S. Salapaka, et al., "High bandwidth nano-positioner: A robust control approach", Sep. 2002, pp. 3232-3241, Review of Scientific Instruments, vol. 73, No. 3.

* cited by examiner

PERFORMANCE IMPROVEMENT OF SIGNAL TRANSFORMATION SCHEMES FOR ULTRA-FAST SCANNING

BACKGROUND

Exemplary embodiments relate to control and manipulation of devices, and more specifically, to controlling devices that position materials at the nanoscale level.

The advent of new techniques to explore properties of near atomic-scale structures has led to the development of the new field of nanotechnology. In the past decade, it has become evident that nanotechnology will make fundamental contributions to science and technology. Inevitably, most schemes of nanotechnology impose severe specifications on positioning.

Precision control and manipulation of devices and materials at the nanoscale, i.e., nanopositioning, is a timely and important aspect of research in nanotechnology. In nanopositioning, one works with mechatronic systems which are designed to move objects over a small range with a resolution down to a fraction of an atomic diameter. The desired attributes of these nanopositioners are extremely high resolution, accuracy, stability, and fast response. The key to successful nanopositioning is accurate position sensing and feedback control of the motion. High accuracy, high bandwidth, and repeatable nanopositioning are a key enabling technology for a variety of applications ranging from scanning-probe microscopy and molecular biology to nanolithography and data storage. One of the key issues in nanopositioning is the trade-off between high bandwidth of the control loop and its sensitivity to measurement noise.

BRIEF SUMMARY

According to exemplary embodiments, a method for controlling a plant is provided. A reference signal is received at a feedback controller that includes signal transformation blocks for signal transformation. The signal transformation blocks translate the signals between high and low frequency domains, and the signal transformation blocks cause the output of the feedback controller to comprise a disturbance signal in addition to the nominal signal. The reference signal is received at the feed-forward controller. The feed-forward controller recreates the disturbance signal that was caused by the signal transformation blocks. The input to the plant is created by: adding the output of the feedback controller, and subtracting the output of the feed-forward controller such that the disturbance signal is removed from the input to the plant. The output of the feed-forward controller is added to the output of the plant.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

As state of the art, a signal transformation approach (STA) has been provided as a new method to address issues related to the trade-off between high bandwidth of the control loop and its sensitivity to measurement noise for nanopositioning. An idea of STA is to transform the high frequency reference signal to an alternate signal with low frequency content. According to this principle the method is called the signal transformation approach (STA). In STA, the alternate signal is tracked in the control loop with a low bandwidth controller and transformed back to the reference signal where appropriate. It has been shown how such a transformation can be derived for a triangular waveform. Tracking of triangular signals arises particularly often in the field of atomic force microscopy, e.g., in metrology applications. However, it is clear that similar transforms can be developed for other classes of reference signals. One issue related to STA is the dynamics imposed by the non-continuous and time-variant nature of the scheme. In particular, simulations and practical measurements may show a high overshoot in examined STA systems and a prolonged settling time. High overshoots may exceed the scanner stroke or cause stability issues in the control loop.

Figure 5:
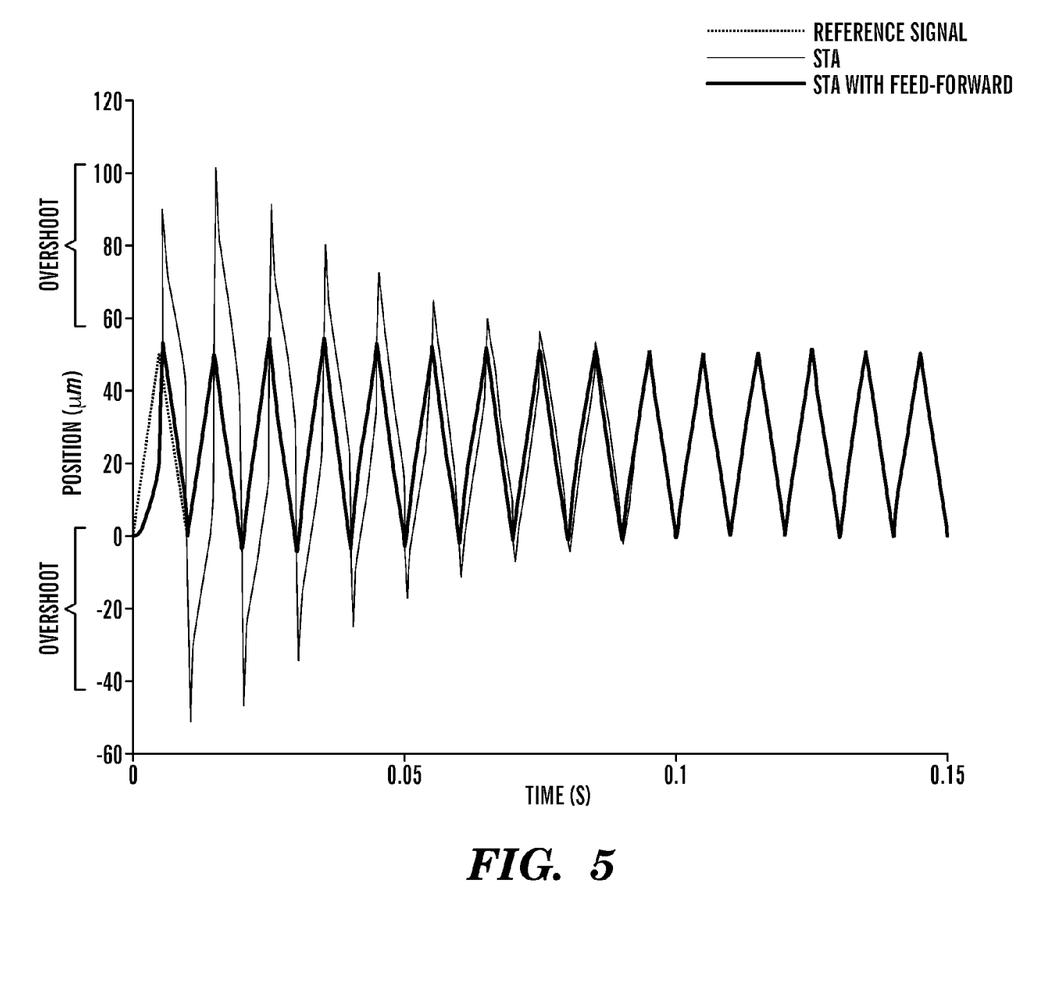
FIG. 5 illustrates a graph depicting improvements accomplished with exemplary embodiments.

In accordance with exemplary embodiments, the disclosure addresses these issues of an STA system by implementing a feed-forward controller, which is configured to significantly improve the performance of the STA system. According to exemplary embodiments, the control signal in an STA control loop is mathematically analyzed and decomposed. Based on this decomposition, a disturbance signal is identified which is responsible for the overshoot and settling characteristics of the STA system. Exemplary embodiments provide a method for reproducing the disturbance signal in a feed-forward controller (shown in FIG. 1), and the feed-forward controller is designed to compensate for the disturbance signal. By using the feed-forward controller according to exemplary embodiments, improvements can be made in overshoot and settling time. For instance, simulation results are provided in FIG. 5 showing improvement utilizing the feed-forward controller as further discussed herein. Furthermore, the applicability and usefulness of the STA is broadened. This is because in design of an original STA loop, one may have to put requirements on the bandwidth of the positioner (i.e., plant) which has to contend with large disturbances and settle down quickly. With the improvement of exemplary embodiments, it is possible that a broader class of plants is applicable for use with STA, for example, plants with a long settling time. Another feature of the feed-forward controller is that under reasonable assumptions, the feed-forward controller does not incorporate the dynamics of the plant. Thus, the feed-forward controller is not affected by uncertainty of the plant model and robustness issues. The scheme of the STA control loop is altered in a minor way by only two feed-in connections from the feed-forward controller. Therefore, no decrease occurs in tracking performance of the original STA scheme. For further information regarding the signal transformation approach, refer to application Ser. No. 12/059,991 entitled Method And Apparatus For Signal Transformation For Positioning Systems, filed on Mar. 31, 2008, which is herein incorporated by reference in its entirety.

Note that although examples of describing the feed-forward controller are provided with respect to the signal transformation approach (STA), exemplary embodiments are not limited in applicability to only the signal transformation approach. Rather, as understood by one skilled, the feed-forward controller discussed herein can be applied to any approach and/or dynamical system.

Figure 1:
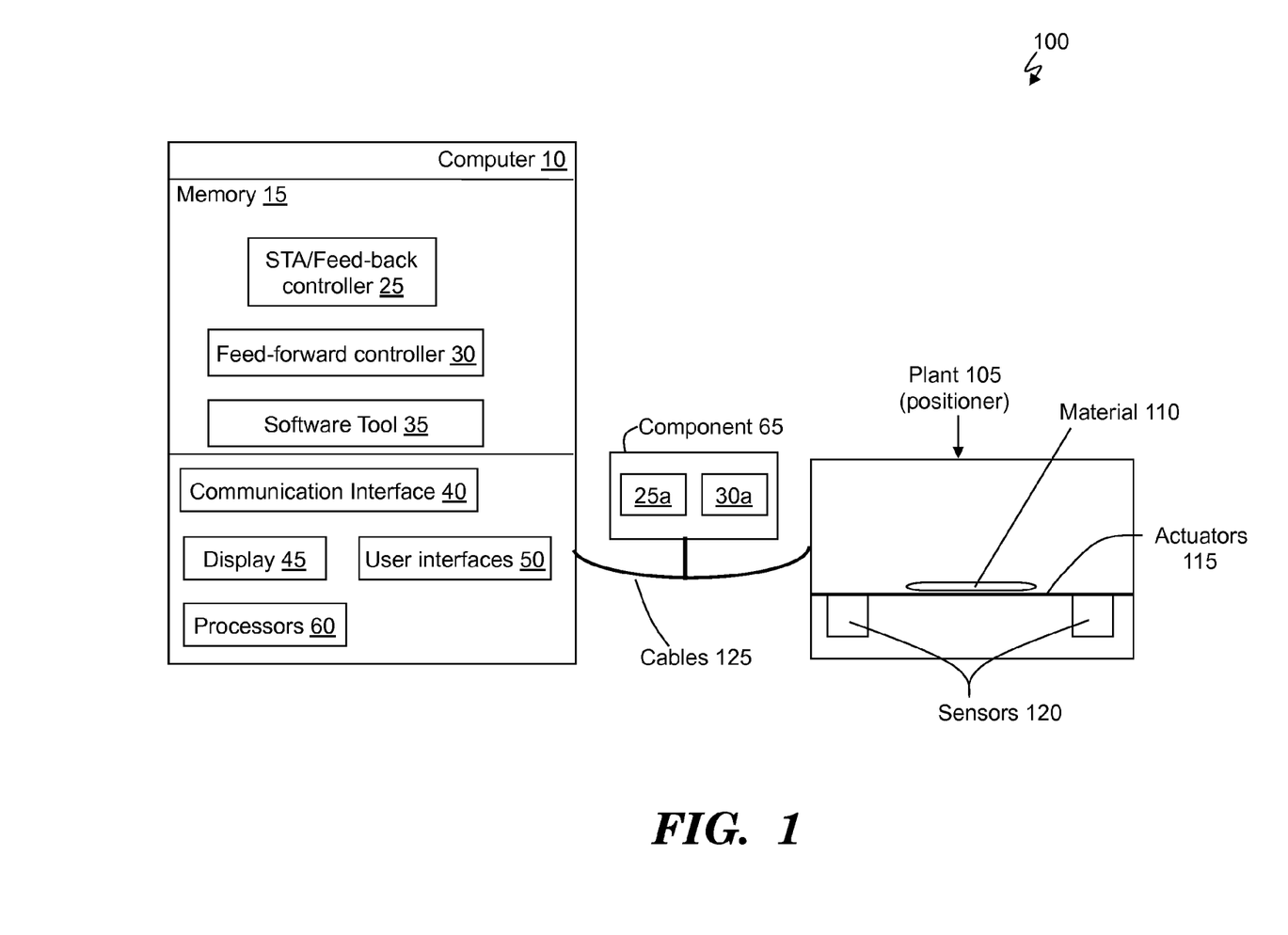
FIG. 1 illustrates a block diagram of a system having various hardware and software elements for implementing exemplary embodiments.

Now turning to FIG. 1, FIG. 1 illustrates a block diagram 100 of a system having various hardware and software elements for implementing exemplary embodiments.

The diagram 100 depicts a computer 10 which may be any type of computing device such as a workstation, server, etc. The computer 10 may include and/or be coupled to memory 15, a communication interface 40, a display 45, user interfaces 50, processors 60, and software applications 25 and 30. The communication interface 40 comprises hardware and software for communicating over a network. The user interfaces 50 may include, e.g., a track ball, mouse, pointing device, keyboard, touch screen, etc, for interacting with the server 10, such as inputting information, making selections, etc.

The computer 10 includes memory 15 which may be a computer readable storage medium. One or more software applications (modules) such the STA/feedback controller 25 and the feed-forward controller 30 may reside on or be coupled to the memory 15. The STA/feedback controller 25 and the feed-forward controller 30 each comprise logic and software components to operate and function in accordance with exemplary embodiments in the form of computer executable instructions. The STA/feedback controller 25 and the feed-forward controller 30 may include a graphical user interface (GUI) which the user can view and interact with. Although the STA/feedback controller 25 and the feed-forward controller 30 are each shown as a single element in FIG. 1 for conciseness, they each may represent numerous software components (or modules) according to exemplary embodiments.

The computer 10 may load and/or include the STA/feedback controller 25 and the feed-forward controller 30. The STA/feedback controller 25 comprises software elements configured to implement the signal transformation approach (STA) and feedback controller. The feed-forward controller 30 comprises software elements configured to implement a feed-forward controller according to exemplary embodiments.

Although the controller 25 and the controller 30 are shown in the memory 15, in one implementation of exemplary embodiments, either one or both of the controllers 25 and 30 may be stand-alone components as represented by stand-alone component 65. For example, the STA/feedback controller 25 may be implemented as hardware (including circuits, logic gates, processors, buffers, memory, etc), software, and/or a combination of both hardware and software, which is shown as STA/feedback controller 25a. Also, the feed-forward controller 30 may be implemented as hardware (including circuits, logic gates, processors, buffers, memory, etc), software, and/or a combination of both hardware and software, which is shown as feed-forward controller 30a. Any discussion for the STA/feedback controller 25 applies to STA/feedback controller 25a, and any discussion for the feed-forward controller 30 applies to feed-forward controller 30a.

FIG. 1 also illustrates an example of a plant 105. The plant 105 (also referred to as a positioner) is the system that needs to be controlled. The plant 105 is a dynamical system as understood by one skilled in the art. The plant 105 may include (but is not limited to) any type of micro/nano-positioning system such as, e.g., auto focus systems, fast mirror scanners, and image steering devices in optics; disk spin stands and vibration cancellation in disk drives; wafer and mask positioning in microelectronics; micropumps, needle valve actuation, linear drives, and piezohammers in precision mechanics; and cell penetration and microdispensing devices in medicine and biology.

The plant 105 includes a material 110 that is being moved. The material 110 may be on the nanoscale. Actuators 115 are configured to move the material 110. The actuators 115 are configured to move the material 110 in, e.g., an x-direction, a y-direction, and/or a z-direction. Sensors 120 are configured to sense, determine, and/or calculate the movement and/or location of the material 110.

Cables 125 connect the computer 10 to the plant 105 so that the computer 10 can be utilized to control and monitor the movement of the material 110 in the plant 105. The display 45 may be utilized to view the movement of the material 110 and to view other data related to the plant 105, such as the sensors 120 and actuators 115.

Figure 2:
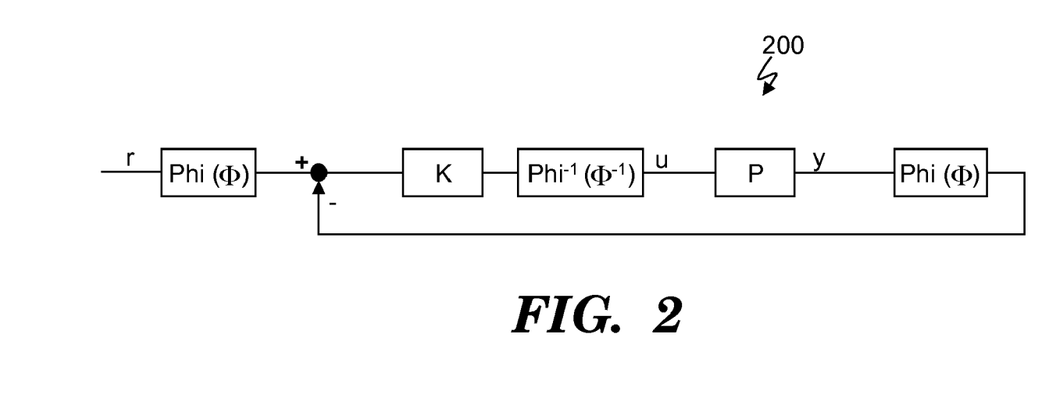
FIG. 2 illustrates a control loop with a signal transformation approach for exemplary embodiments.
Figure 4:
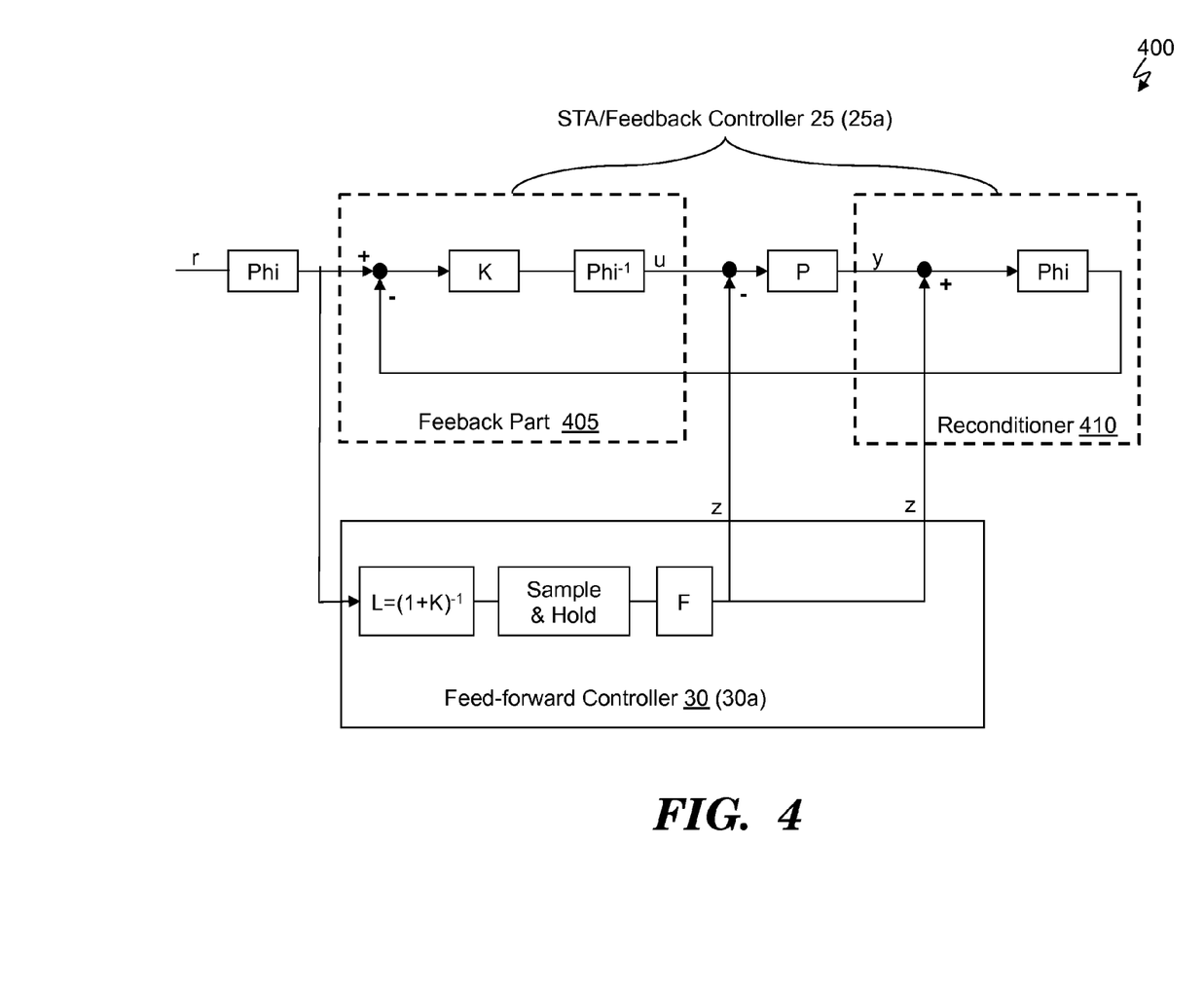
FIG. 4 illustrates a scheme of a feed-forward controller and corresponding connection to a signal transformation approach/feedback controller according to exemplary embodiments.

FIG. 2 illustrates a control loop 200 with the signal transformation approach (STA) executed by the STA/feedback controller 25. What follows is a mathematical description of the STA system and also a description of the STA system combined with the feed-forward controller of exemplary embodiments. The control signal in the control loop 200 is decomposed into a nominal part and a disturbance part. FIG. 4 illustrates a control loop 400 interconnected to the control loop 200 of the signal transformation approach according to exemplary embodiments.

Now turning to FIG. 2, let us divide the time domain into intervals of form (iT, (i+1)T), where i=0, 1, 2 . . . and T is the half period of the triangular reference signal r, where the reference signal r has a triangular shape. By definition, in each of the intervals the signal transformation function $\Phi$ (phi) and the signal transformation function $\Phi^{-1}$ (phi$^{-1}$) remain constant and are the perfect inverse of each other. Therefore, in one interval the signal transformation functions $\Phi$ and $\Phi^{-1}$ are completely transparent to all elements in the control loop 200. The plant P experiences specific disturbances only at time points iT, i=0, 1, 2 . . . , where both signal transformation functions $\Phi$ and $\Phi^{-1}$ change the sign and offset. However, for P(s)=1, these disturbances cancel out completely and the (feedback) controller K does not notice that it is running in an STA loop. This allows us to describe the nature of the disturbances in a simplified manner.

In FIG. 2, the reference signal r is a high frequency signal that appears as a triangular signal. The signal transformation function $\Phi$ (phi) transforms the triangular signal to a ramp signal. The feedback controller K receives the difference between the feedback of the plant P (which is output y) and the ramp signal r. The output of the feedback controller K is transformed by the signal transformation function $\Phi^{-1}$ (phi$^{-1}$) into a triangular signal control signal u to be input into the plant P. After the control signal u is input into the plant P, the output y of the plant P is transformed by the signal transformation function $\Phi$ (phi) back into a ramp signal and fed into the feedback controller K.

Figure 3:
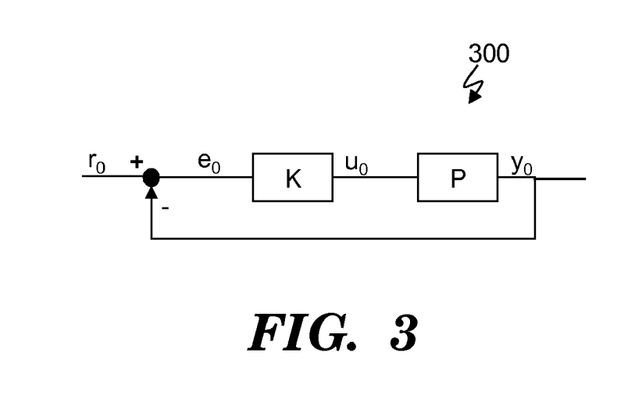
FIG. 3 illustrates a system with a plant and controller for exemplary embodiments.

Now, with reference to a system 300 in FIG. 3, we will designate the system 300 with the same plant P and controller K as in FIG. 2, but without the signal transformation approach, and we denote the system 300 as the canonical system. In FIG. 3, we will denote the control signal in the system 300 as $u_0(t)$ and the alternate (i.e., ramp) reference signal as $r_0(t)$. The output error is measured as $e_0(t)=r_0(t)-y_0(t)$, which in the case of $P(s)=1$ boils down to $e_0(t)=r_0(t)-u_0(t)$.

We will assume that the canonical system 300 is stable and converges to the alternate signal with zero steady-state error, in other words $\lim_{t\to\infty} e_0(t)=0$. One sufficient condition for this is that PK is of type 2 as understood by one skilled in the art.

Now, the control signal, i.e., the output of the system with unity plant, will be described.

Theorem 1 (Control signal inside the intervals): The control signal u(t) of the system with a unit gain plant $P(s)=1$ is a piecewise continuous function, defined over the intervals (iT, (i+1)T), with discontinuity points exactly at iT, for i= 0, 1, 2, . . . . Let A be the amplitude of the triangular reference signal. The following relationships hold:

$u(iT+t)=-e_o(iT)+[u_o(iT+t)-u_o(iT)]$ for $i=0,2,4,6,...$
and $t\in(0,T)$ $u(iT+t)=A+e_o(iT)-[u_o(iT+t)-u_o(iT)]$ for $i=1,3,5,7,...$
and $t\in(0,T)$ Theorem 2 (Control signal at the discontinuity points): Let A be the amplitude of the triangle reference signal. The following holds:

$\lim_{t\to iT_+} u(t)=-e_o(iT)$ for $i=0,2,4,6,...$ $\lim_{t\to (i+1)T_-} u(t)=A-e_o((i+1)T)$ for $i=0,2,4,6,...$ $\lim_{t\to iT_+} u(t)=A+e_o(iT)$ for $i=1,3,5,7,...$ $\lim_{t\to (i+1)T_-} u(t)=e_o((i+1)T)$ for $i=1,3,5,7,...$ Let us now decompose the control signal u(t) as:

$u(t)=u_n(t)+u_d(t)$ where $u_n(t)$ denotes the nominal control signal and $u_d(t)$ denotes the STA-imposed disturbance. Explicitly, we obtain:

$u_d(iT+t)=-e_o(iT)$ for $i=0,2,4,6,...$ and $t\in(0,T)$ $u_d(iT+t)=e_o(iT)$ for $i=1,3,5,7,...$ and $t\in(0,T)$ $u_n(iT+t)=u_o(iT+t)-u_o(iT)$ for $i=0,2,4,6,...$ and $t\in(0,T)$ $u_n(iT+t)=A-[u_o(iT+t)-u_o(iT)]$ for $i=1,3,5,7,...$ and $t\in(0,T)$ Note that the exact description of u(t) and $u_d(t)$ was derived under the assumption $P(s)=1$. In the context of the disturbance analysis, this gives a correct estimate even for plants P with higher order dynamics. This is because the disturbance signal is based on the low-frequency behavior of the controller K and will not be substantially affected by higher order dynamics of the plant P. We can assume the positioners (i.e., plant P) 105 can be modeled as a simple gain in the low frequency regime.

Now turning to the FIG. 4, FIG. 4 illustrates a scheme of the feed-forward controller 30 and its connection to the STA/feedback controller 25 according to exemplary embodiments. A block diagram 400 illustrates the STA control loop 200 interconnected with the control loop of the feed-forward controller 30.

By having an explicit description of the STA-imposed disturbance $u_d(t)$ (which is part of the control signal (u)), we are able to design a feed-forward controller 30 which compensates for the disturbance. Based on the previous discussion, the disturbance signal $u_d(t)$ can be reproduced as follows:

1) Transform the reference signal r (i.e., the triangular waveform) to the alternate signal (i.e. the ramp waveform) by the signal transformation function $\Phi$ (phi);
2) Use the alternate signal as the input to the auxiliary transfer function $L=1/(1+K)$ which maps the alternate signal input to the error of the canonical system (i.e., reproduces the error signal $e_o(t)$);
3) With frequency of 1/T, where T is the half-period of the reference signal, sample the value of L and hold the sampled value of L for the rest of the time period (in the sample & hold); and
4) Apply the operator F defined as:

$$F(x) = -x(t) \quad \text{for } i = 0, 2, 4, 6, ...$$
$$= x(t) \quad \text{for } i = 1, 3, 5, 7, ...$$

Reproducing the disturbance signal is a feature of the feed-forward controller 30. The resulting feed-forward signal z is then applied with an opposite sign on the input of the plant P 105 and with a positive sign after the measurement of output value y of the plant P 105. Applying the negative feed-forward signal z to the input of the plant P 105 cancels out disturbance signal $u_d(t)$ in the control signal u from the signal transformation function $\Phi^{-1}$ (phi$^{-1}$). Applying the positive feed-forward signal z to the output of the plant P 105 keeps the invariants of the original STA scheme and thus allows the feedback input to the controller K to appear as though no changes have occurred to the original STA scheme. The positive feed-forward signal z combined with the output y of the plant P forms what can be called a transparent signal (for explanation purposes) because the transparent signal is identical to the normal signal that would be input into the last signal transformation function $\Phi$ (phi) of the STA if the feed-forward controller 30 were not present. Also, for explanation purposes, the first dashed box may be considered the feedback part 405 and the second dashed box may be considered the reconditioner 410. The reconditioner 410 includes the last signal transformation function $\Phi$ (phi) whose purpose is to transform the output y of the plant P (which is now combined with the output of the feed-forward controller 30) back to a ramp waveform to be fed back into controller K of the feedback part 405.

The solution discussed herein utilizing the feed-forward controller 30 provides improvements in overshoot and settling time, allows the signal transformation approach (STA) to be applicable to a broader class of plants (for example, plants with a long settling time), does not require the plant model in the feed-forward controller 30, and only makes a minor change to the original STA scheme.

In one implementation, a software tool 35 is configured to automatically and/or assist a user to decompose the control signal u(t) of the signal transformation approach to determine the nominal control signal $u_n(t)$ and disturbance control signal $u_d(t)$ by executing the mathematical operations discussed above. The output of the software tool 35 may be fed into the feed-forward controller 30 to produce the control loop of the feed-forward controller 30 illustrated in FIG. 4.

With reference to FIG. 5, FIG. 5 shows the reference signal r and shows the overshoot of the STA. In this simulation, the STA takes time to settle down the plant output to the position of the of the original reference signal r. The STA with feed-forward signal (produced with the feed-forward controller 30) shows that the STA with feed-forward does not cause the overshoot and requires less time to settle down. Also, the STA with feed-forward actually covers majority of the reference signal shown in FIG. 5 because as can be seen in the STA with feed-forward signal, the plant output is substantially identical to the reference signal.

Figure 6:
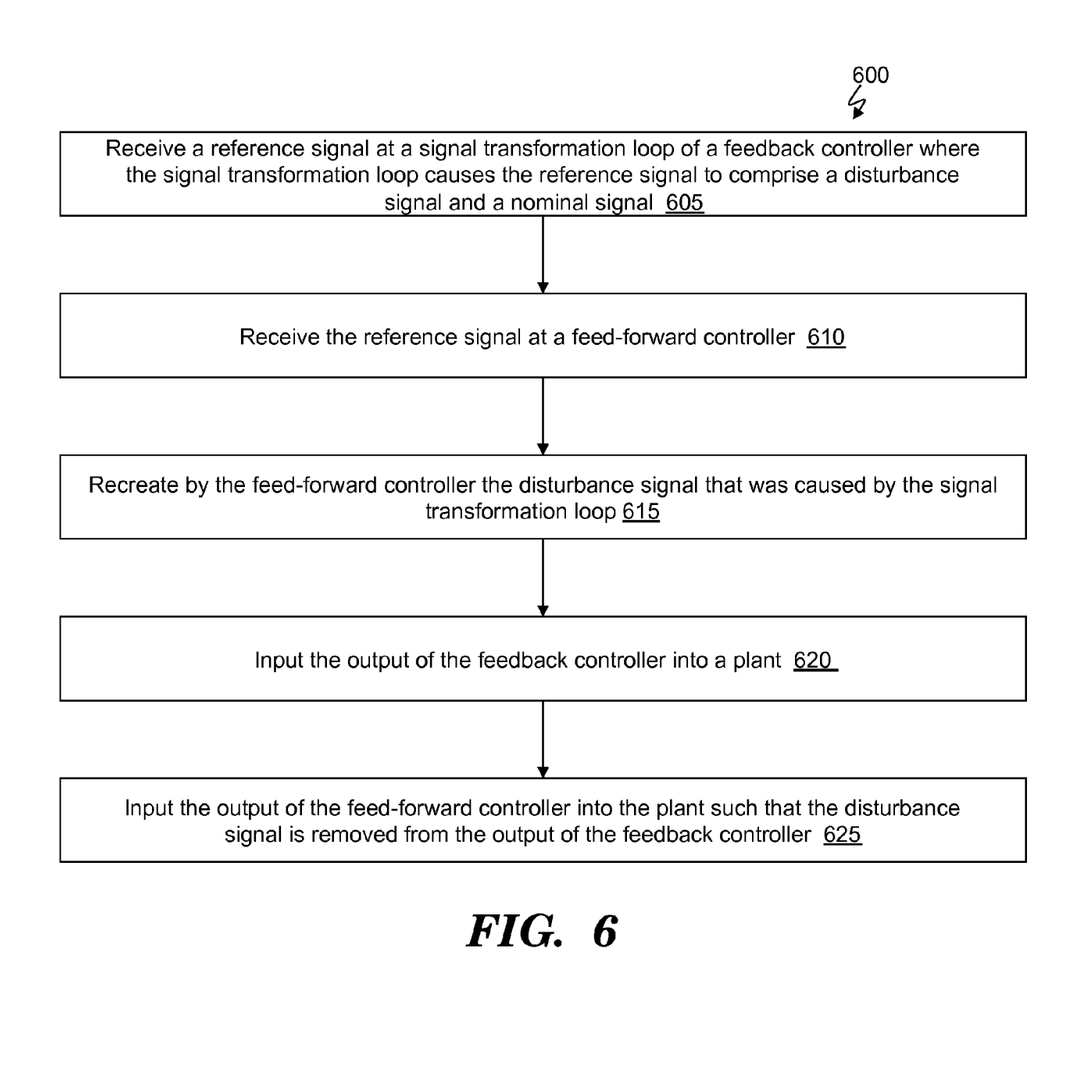
FIG. 6 illustrates a flow chart of process in accordance with exemplary embodiments.

Now turning to FIG. 6, FIG. 6 illustrates a flow chart 600 of method in accordance with exemplary embodiments. At operation 605, a reference signal r is received at a signal transformation approach loop (shown in FIGS. 2 and 4) of the STA/feedback controller 25. The signal transformation loop of the signal transformation approach causes the reference signal to now comprise an undesirable disturbance signal $u_d(t)$ and a nominal signal $u_n(t)$. The signal transformation functions $\Phi$ and $\Phi^{-1}$ are signal transformation blocks that are configured to translate the signals between high and low frequency domains.

At operation 610, the reference signal is also received at the feed-forward controller 30.

At operation 615, the feed-forward controller 30 is configured to recreate the same disturbance signal $u_d(t)$ that (was caused and/or) is being caused by the signal transformation loop.

At operation 620, the output of the feedback controller 25 is input into the plant P 105.

At operation 625, as discussed herein, the output of the feed-forward controller 30 is combined with the output of the feedback controller 25, such that the disturbance signal is removed when the combined signal is input into the plant P 105.

At operation 630, the output of the feed-forward controller 30 is added to the output of the plant P 105.

Further, the signal transformation approach of the STA/feedback controller 25 can cause an overshoot of the reference signal r and the overshoot is (or is contained within) the disturbance signal $u_d(t)$, and the output of the feed-forward controller 30 is configured to remove the overshoot of the reference signal caused by the output of the feedback controller. Inputting the output of the feed-forward controller 30 into the plant P, such that the disturbance signal is removed from the output of the feedback controller 20, causes the output of the plant P to be substantially identical to the reference signal r. Also, an output of the plant is combined with the output of feed-forward controller to form a transparent signal, where the transparent signal is configured to make effects of the feed-forward controller transparent to the signal transformation loop.

Figure 7:
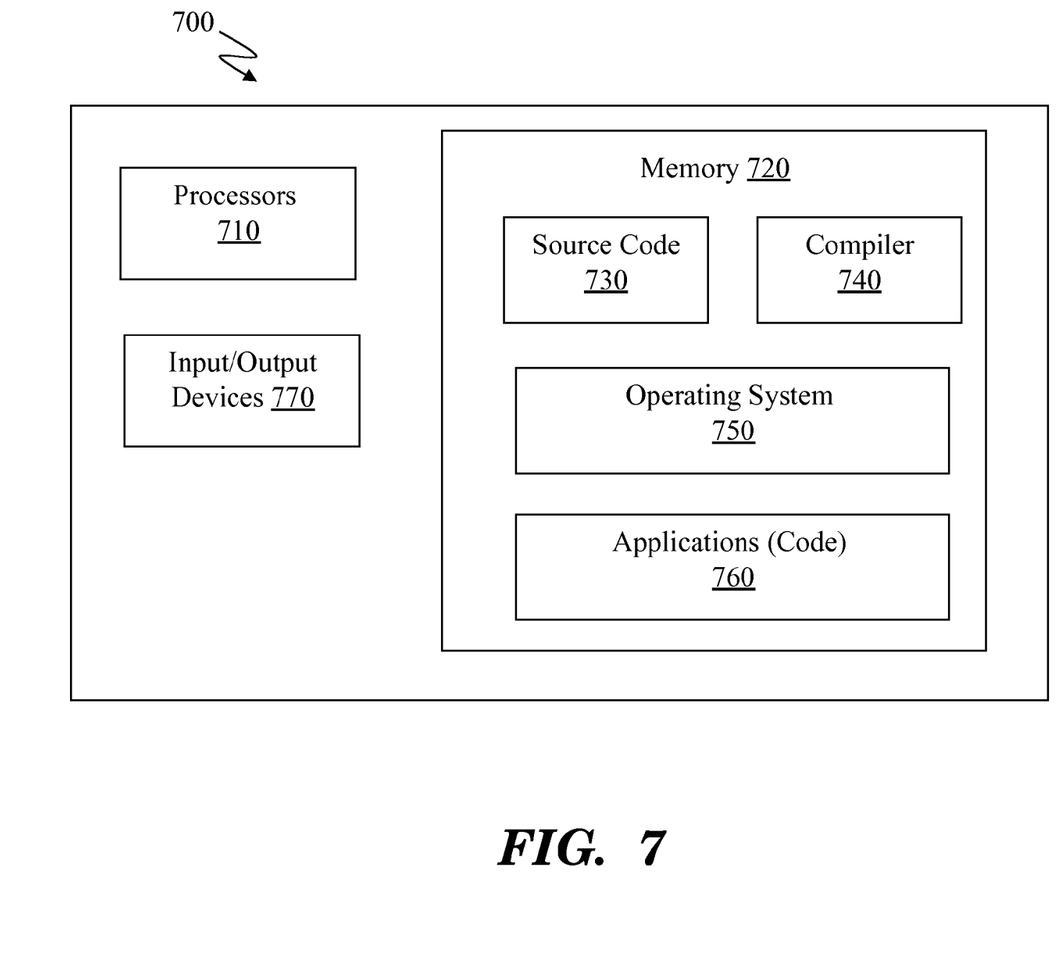
FIG. 7 illustrates an example of a computer having capabilities, which may be included in exemplary embodiments.

FIG. 7 illustrates an example of a computer 700 having capabilities, which may be included in exemplary embodiments. Various methods, procedures, modules, flow diagrams, tools, application, and techniques discussed herein may also incorporate and/or utilize the capabilities of the computer 700. Moreover, capabilities of the computer 700 may be utilized to implement features of exemplary embodiments discussed herein. One or more of the capabilities of the computer 700 may implement any element discussed herein, including the computer 10, the component 65, and/or the plant (P) 105.

Generally, in terms of hardware architecture, the computer 700 may include one or more processors 710, computer readable storage memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the computer readable memory 720 may include one or more separate programs, each of which comprises an ordered listing of executable instructions for implementing logical functions. The software in the memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments. The application 760 of the computer 700 may represent numerous applications, agents, software components, modules, interfaces, controllers, etc., as discussed herein but the application 760 is not meant to be a limitation.

The operating system 750 may control the execution of other computer programs, and provides scheduling, input-output control, file and data management, memory management, and communication control and related services.

The application(s) 760 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or an intranet. The I/O devices 770 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable medium 720 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 720 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 700 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 8:
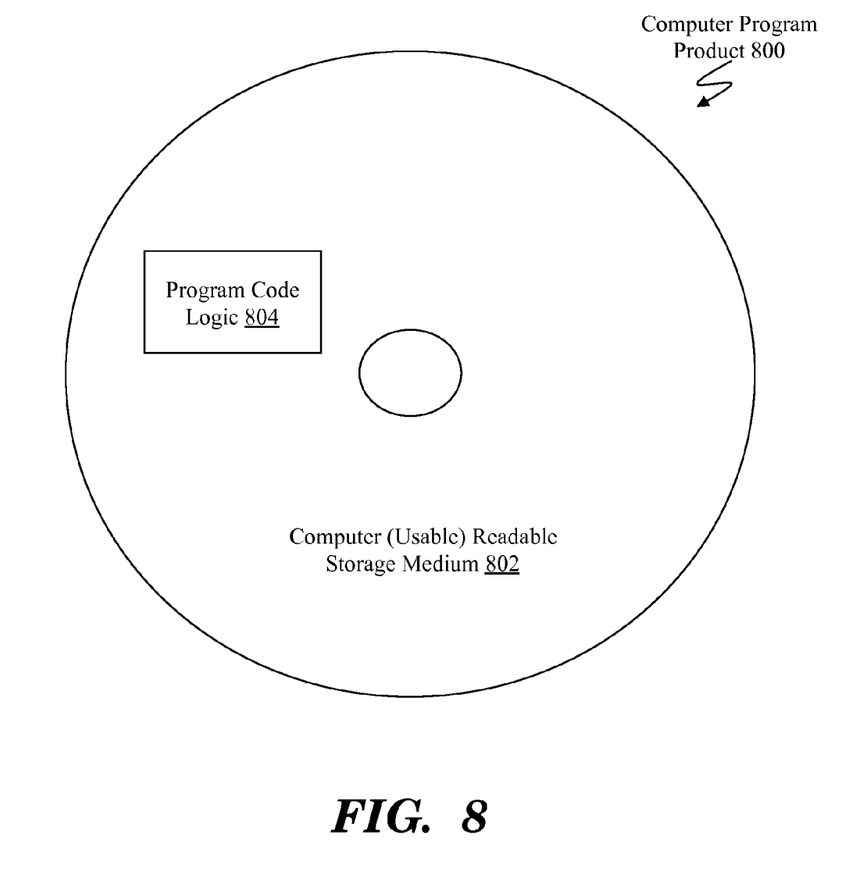
FIG. 8 illustrates a computer program product on a computer readable storage (usable) medium according to exemplary embodiments.

As described above, embodiments can be embodied in the form of computer-implemented processes and apparatuses for practicing those processes. In exemplary embodiments, the invention is embodied in computer program code executed by one or more network elements. Embodiments include a computer program product 800 as depicted in FIG. 8 on a computer readable storage (usable) medium 802 with computer program code logic 804 containing instructions embodied in tangible media as an article of manufacture. Exemplary articles of manufacture for computer usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for controlling a plant, comprising:
    receiving a reference signal at a feedback controller comprising signal transformation blocks for signal transformation;
    wherein the signal transformation blocks translate signals between a first frequency domain and a second frequency domain; and
    generating by the feedback controller a disturbance signal in addition to a nominal signal as an output of the feedback controller;
    receiving the reference signal at a feed-forward controller, the reference signal received at the feed-forward controller being a same as recived at the feedback controller;
    recreating by the feed-forward controller a recreated disturbance signal to be a same as the disturbance signal that was caused by the signal transformation blocks, the recreated disturbance signal from the feed-forward controller being generated separate from the disturbance signal from the feedback controller;

creating an input to the plant by:
adding the output of the feedback controller; and
subtracting the recreated disturbance signal generated by the feed-forward controller from the output generated by the feedback controller to remove the disturbance signal from the input to the plant; and
adding the recreated disturbance signal from the feed-forward controller to the output of the plant;
wherein the recreated disturbance signal from the feed-forward controller is applied to both the input and the output of the plant.

2. The method of claim 1, wherein the signal transformation blocks cause a deviation of the plant output from the reference signal and the deviation is caused by the disturbance signal.

3. The method of claim 1, wherein the output of the feed-forward controller is configured to remove a deviation of the reference signal caused by the disturbance signal.

4. The method of claim 1, wherein subtracting the output of the feed-forward controller from the output of the feedback controller such that the disturbance signal is removed from the input to the plant causes the output of the plant to be substantially identical to the reference signal.

5. The method of claim 1, wherein the output of the plant is combined with the output of feed-forward controller to form a transparent signal.

6. The method of claim 5, wherein the transparent signal is configured to make effects of the feed-forward controller transparent to a signal transformation loop.

7. The method of claim 5, further comprising inputting the transparent signal into a transformation function of the signal transformation loop, wherein the transparent signal appears normal to the transformation function.

8. The method of claim 7, wherein an output of the transformation function is input into the feedback controller.

9. A device configured for controlling a plant, comprising:
memory for storing one or more programs; and
a processor, functionally coupled to the memory, the processor being responsive to computer-executable instructions contained in the one or more programs and operative for:
receiving a reference signal at a feedback controller comprising signal transformation blocks for signal transformation;
wherein the signal transformation blocks translate signals between a first frequency domain and a second frequency domain; and
generating by the feedback controller a disturbance signal in addition to a nominal signal as an output of the feedback controller;
receiving the reference signal at a feed-forward controller, the reference signal received at the feed-forward controller being a same as recived at the feedback controller;
recreating by the feed-forward controller a recreated disturbance signal to be a same as the disturbance signal that was caused by the signal transformation blocks, the recreated disturbance signal from the feed-forward controller being generated separate from the disturbance signal from the feedback controller;
creating an input to the plant by:
adding the output of the feedback controller; and
subtracting the recreated disturbance signal generated by the feed-forward controller from the output generated by the feedback controller to remove the disturbance signal from the input to the plant; and
adding the output of the feed-forward controller to the output of the plant;
wherein the recreated disturbance signal from the feed-forward controller is applied to both the input and the output of the plant.

10. The device of claim 9, wherein the signal transformation blocks cause a deviation of the plant output from the reference signal and the deviation is caused by the disturbance signal.

11. The device of claim 9, wherein the output of the feed-forward controller is configured to remove a deviation of the reference signal caused by the disturbance signal.

12. The device of claim 9, wherein subtracting the output of the feed-forward controller from the output of the feedback controller such that the disturbance signal is removed from the input to the plant causes the output of the plant to be substantially identical to the reference signal.

13. The device of claim 9, wherein the output of the plant is combined with the output of feed-forward controller to form a transparent signal.

14. The device of claim 13, wherein the transparent signal is configured to make effects of the feed-forward controller transparent to the signal transformation loop.

15. The device of claim 13, further comprising inputting the transparent signal into a transformation function of the signal transformation loop, wherein the transparent signal appears normal to the transformation function.

16. The device of claim 15, wherein an output of the transformation function is input into the feedback controller.

17. A computer program product for controlling a plant, the computer program product comprising:
a non-transitory computer readable storage medium having computer readable program code embodied therewith, the computer readable program code for providing fast scanning comprising:
receiving a reference signal at a feedback controller comprising signal transformation blocks for signal transformation;
wherein the signal transformation blocks translate signals between a first frequency domain and a second frequency domain; and
generating by the feedback controller a disturbance signal in addition to a nominal signal as an output of the controller;
receiving the reference signal at a feed-forward controller, the reference signal recived at the feed-forward controller being a same as received at the feedback controller;
recreating by the feed-forward controller a recreated disturbance signal to be a same as the disturbance signal that was caused by the signal transformation blocks, the recreated disturbance signal from the feed-forward controller being generated separate from the disturbance signal from the feedback controller;
creating an input to the plant by:
adding the output of the feedback controller; and
subtracting the recreated disturbance signal generated by the feed-forward controller from the output generated by the feedback controller to remove the disturbance signal from the input to the plant; and
adding the output of the feed-forward controller to the output of the plant;
wherein the recreated disturbance signal from the feed-forward controller is applied to both the input and the output of the plant.

18. The computer program product of claim 17, wherein the signal transformation blocks cause a deviation of the plant output from the reference signal and the deviation is caused by the disturbance signal.

19. The computer program product of claim 17, wherein the output of the feed-forward controller is configured to remove a deviation of the reference signal caused by the disturbance signal.

20. The computer program product of claim 17, wherein subtracting the output of the feed-forward controller from the output of the feedback controller such that the disturbance signal is removed from the input to the plant causes the output of the plant to be substantially identical to the reference signal.

* * * * *